(12) United States Patent
Harper et al.

(10) Patent No.: US 6,267,000 B1
(45) Date of Patent: Jul. 31, 2001

(54) LEAK LOCATION

(75) Inventors: Mark Francis Lucien Harper; Martin Thompson, both of Cambridge (GB)

(73) Assignee: AW Creative Technologies Limited, Cambridgeshire (GB)

( * ) Notice: Subject to any disclaimer, the term of this patent is extended or adjusted under 35 U.S.C. 154(b) by 0 days.

(21) Appl. No.: 09/284,848

(22) PCT Filed: Oct. 21, 1997

(86) PCT No.: PCT/GB97/02908

§ 371 Date: Oct. 21, 1999

§ 102(e) Date: Oct. 21, 1999

(87) PCT Pub. No.: WO98/19147

PCT Pub. Date: May 7, 1998

(30) Foreign Application Priority Data

Oct. 25, 1996 (GB) ................................. 9622201

(51) Int. Cl.[7] ..................................... G01M 3/24
(52) U.S. Cl. ................. 73/40.5 R; 73/592; 73/49.1; 73/40
(58) Field of Search .................. 73/40, 40.5 R, 73/40.5 A, 49.1, 592

(56) References Cited

U.S. PATENT DOCUMENTS

| | | |
|---|---|---|
| 4,455,863 * | 6/1984 | Huebler et al. ................. 73/40.5 A |
| 4,457,163 | 7/1984 | Jäckle ............................... 73/40.5 A |
| 4,697,456 | 10/1987 | Maser . |

FOREIGN PATENT DOCUMENTS

| | | | |
|---|---|---|---|
| 603804 * | 4/1978 | (SU) ............................... 73/40.5 A |
| 658356 * | 4/1979 | (SU) ............................... 73/40.5 A |

\* cited by examiner

*Primary Examiner*—Daniel S. Larkin
(74) *Attorney, Agent, or Firm*—Blank Rome Comisky & McCauley, LLP

(57) ABSTRACT

When an underground pipe carrying a fluid, such as a buried water-pipe, develops a leak the leak must first be located before it can be repaired. One common location method makes use of the fact that the leaking fluid often creates a noise, typically a hissing sound, which is transmitted through the ground, and although rapidly attenuated can be heard with suitable highly sensitive ground microphones and is therefore useful to field crews as a means of locating leaks. Unfortunately, the sound levels can be grossly distorted by underground heterogenities, and can easily be confused or even swamped by other sound sources above ground, and in general ground microphones used like this do not seem to be effective. The invention deals with the problems entailed in this technique by a method—and apparatus —which involves using semi-automated equipment to listen (either simultaneously or sequentially) to the leak sound source (1) from a multiplicity of different positions (as 3) spaced all around the sound source, and by then suitably combining and processing the received signals to provide the desired indication of the source's location.

30 Claims, 4 Drawing Sheets

LEAK LOCATION

FIELD OF INVENTION

This invention is concerned with leak location, and relates in particular to the determination of the location of a leak of fluid in an underground pipe. It has regard especially to leak location by means of a surface detector array which detects ground motion.

BACKGROUND OF THE INVENTION

There are many situations in which an underground pipe carrying a fluid, a gas or a liquid, develops a leak, which leak must then be located and repaired. A good example is the case of water distribution pipes buried at a depth down to a few metres below ground. One common location method makes use of the fact that the leaking fluid often creates a noise, typically a hissing sound, which is conducted along the pipe as vibration. The sound is also transmitted through the ground. Although the sound is rapidly attenuated by the ground, it is possible to hear the sound with suitable highly sensitive ground microphones, and therefore ground microphones are often made available to field crews in the water industry as a means of identifying and locating leaks.

It is naturally desirable to locate the leak simply by listening to the sound at the ground surface. Crews do sometimes try to use a ground microphone for final fixing of the position of a leak by moving the microphone around and searching for the point at which the leak noise is loudest. Unfortunately, the sound levels can be grossly distorted by underground heterogenities, and can easily be confused or even swamped by other sound sources above ground. In general, then, ground microphones do not seem to be effective, mainly because background noise obscures the signal, and this has reduced their credibility with field crews. The invention deals with these types of problems encountered by water leak location teams by listening to the leak sound source from a multiplicity of different positions spaced all around the sound, listening either simultaneously or sequentially, and by then suitably combining and processing the received signals to provide the desired indication of the source's location.

SUMMARY OF INVENTION

In one aspect, therefore, the invention provides a method of determining the location of a leak in an underground pipe carrying a fluid, in which method the movement of the ground caused by the fluid as it leaks from the pipe is listened to using sensors at a multiplicity of positions spaced over the ground surface and disposed within an area extending over the suspected location of the leak, and by suitably combining and operating upon the signal information received at each position there is determined the actual location of the leak.

The invention concerns determining the location of a leak in an underground pipe carrying a fluid. The pipe may be of any sort, that is, made of any appropriate material and of any size, and the fluid may likewise be of any sort, gas or liquid. The invention is, however, of particular use in connection with water-bearing pipes.

Underground water-bearing pipes can be of a wide variety of diameters ranging from a few centimetres (for local distribution to domestic property) to more than a metre (for mains service pipes). The depth of burial can also vary from the order of half a metre down to several metres.

The type of ground in which the pipe is buried varies a great deal in terms of its homogeneity, its stiffness, and the top cover. For example, the surrounding ground may be a roadbed, in which case it will be well consolidated, and propagates sound well. It could equally well be a field or grass verge, which is less well consolidated and so sound travelling therethrough propagates less well. Moreover, the actual top surface may be one or more of several materials, typically concrete, tarmacadam or soft earth.

The material of the pipe is likely to depend upon both the application and the age of the pipe. Common materials encountered are cast iron, ductile iron, high or medium density polyethylene, and UPVC (ultraviolet-stabilised polyvinyl chloride). The wall thickness of the pipe is likely to vary (with the material and the application) from a few millimetres upwards over a range factor of the order of five—thus to perhaps twenty-five millimetres and more.

Depending on the pipe's purpose, the pressure within the pipe can range from little more than atmospheric pressure to several Bars. Any such pipe can develop a fault which results in a leak. The fault can be a small diameter hole, a circumferential crack, a longitudinal crack, or a fault at a joint from which the pipe's contents can seep slowly or rapidly depending upon the size of the fault. Very slow seeping leaks which can occur at poorly fitting joints are not likely to generate sufficient leak noise to be heard at the surface of the ground. Other leaks are known to generate noise at the leak which propagates along the pipe wall, and through the fluid in the pipe, through the ground around the pipe, and through any combination of these paths.

A pool of fluid-saturated ground may develop around the leak. There may be a washed out volume around the leak, so that the leak flows directly into the pool rather than directly into the ground.

The pipe material, wall thickness, diameter, ground condition and nature of the leak will all influence the magnitude, the frequency range and frequency spectrum of the leak noise generated, but will not prevent the leak noise occurring. The magnitude of the ground motion will attenuate rapidly with distance from the source. Similarly, the frequency range will fall rapidly with distance from the leak (the rate of attenuation normally increases with frequency, so that higher frequencies are preferentially attenuated as distance increases). The level of ground motion expected will be of the order of 0.01 m/s$^2$, being higher or lower by an order of magnitude or more depending on the leak, the depth of burial, the type of ground, and the lateral distance from the leak. Similarly, the frequency range can be expected to be up to a few kilohertz, depending on circumstances, sometimes it will be below one kilohertz. The motion of the ground is liable to be predominantly vertical with some lateral motion.

In the invention the movement of the ground caused by the fluid as it leaks from the pipe is listened to from a multiplicity of positions spaced over the ground surface and disposed within an area extending over the suspected location of the leak. The multiplicity of positions at which the motion of the ground is measured can consist of a number of discrete locations forming an array, a geometrical array, possibly a one-dimensional (or linear) array, but preferably a two-dimensional (or area) array, over the area of ground. Such a system of discrete locations involves an individual measurement sensor sited at each discrete position, and is referred to herein as a fixed array system. If possible, where the array is linear, or has linear components, then the, or one of the, lines of sensor positions should preferably be aligned with the underground pipe being checked.

Alternatively, the ground may be scanned by a remote measurement system, in effect a single sensor is moved, position by position, through and over the chosen area so that it may listen from a large multiplicity of positions one after the other. Indeed, the multiplicity of positions can be so large, and the individual, adjacent positions can be so close to each other, that the ground motion is effectively measured as a continuous distribution with respect to position on the surface. A system using a sequence of positions is referred to herein as a scanning system.

The invention uses the measured motion of the ground surface above the leak in order to determine the location of the leak. The method involves the detection of ground motion over an area of ground extending over the suspected location of the leak. Although in principle this area could be as small or as large as desired, most preferably the area's lateral dimensions do not greatly exceed the depth of the pipe in which the leak has occurred, say, not more than three times that depth. Thus, given the range of pipe depths of zero to two metres, the lateral dimensions of the area investigated would be similar, at around two to at most five metres.

The ground movement is listened to by sensor devices positioned at the chosen positions spaced over the leak area's ground surface. The actual detector elements forming the active portion of the sensors may be of any type able to detect motion of the ground at a point without substantially altering the ground movement. For example, they may be moving coil electrodynamic devices (which respond to velocity) or piezoelectric or piezoresistive accelerometers (which respond to acceleration). Alternatively, they may work by optical interference. Normal seismic geophones of the velocity-sensitive type are limited in upper frequency by their casing design but this is not an intrinsic limit; the intrinsic limits on the sensor are the sensitivity (it has to be able to respond to the small ground motion), the background electrical noise (the measured signal must exceed the background electrical noise in the device), and the mass (heavy sensors load the ground and modify its motion). Relatively-light weight sensors are therefore essential.

A significant problem with discrete sensors is that of the stiffness of the interface between the device and the ground. When affixed intimately to the ground the sensor device should faithfully respond to the movement of the ground. However, when simply placed on the ground and held only under gravity such devices have a resonant frequency which is dependant on the mass of the device and the stiffness of the interface between the ground and the device. The resonant frequency results in the device responding preferentially to any excitation at that frequency, and as a consequence the true magnitude and phase of the signal may be lost in the region around that frequency. Further., the exaggerated signal at the resonant frequency means that subsequent signal amplifiers may need to have their gain reduced to avoid overloading. This may result in poor signal-to-noise ratios for signals not near the resonant frequency.

Also, as noted hereinbefore the transmission loss through the ground varies with frequency, which means that the range of frequencies observed at a sensor will depend upon the distance from the leak. With a resonant sensing device, the measured response would not be defined uniquely by the distance to the leak either in phase or magnitude. Such mounting resonant frequencies should therefore very preferably be avoided. While in seismic applications the frequencies of interest are low, of the order of one hundred Hertz, and seismic geophones are designed to have their first resonance above the frequencies of interest, in the present application the frequencies of interest can extend up to a few kilohertz. The static weight of a 100 gm sensor brings the resonant frequency to the region of one kHz, which is well within the measurement range of interest. A 10 gm device would raise the mounting resonance to the order of three kHz, which is still in the measurement range.

The lower the weight of the sensor the greater the intrinsic noise of the device. This noise limits the lowest practical weight of a sensor for this application to more than 10 gm. The possibility of an unwanted mounting resonance occurring within the frequency range of interest can however be mitigated in part or even in whole by damping the movement of the sensor, and such damping can be provided by mounting the sensor on a mat of some rubber-like material such that the mat presses the sensor onto the ground.

This concept is itself both novel and inventive, and in a second aspect the invention provides, for use in the method of the invention, ground-motion detection apparatus comprising a multiplicity of discrete ground-motion sensors each in use contactable with the ground, together with a body of a high damping material to hold each sensor in ground contact and thereby avoid significant mounting resonance effects between the sensor and the ground.

The nature of the sensors, and the manner in which they are disposed, is discussed hereinbefore. It might be helpful, though, to add the following. There are two basic types of motion sensor that do not need an absolute frame of reference. One such type is the geophone type, as used in seismology; these respond to velocity, usually by detecting the current generated in a coil moving in a magnetic field (like a dynamo). Geophones are very sensitive, low noise devices, but typically have internal resonances below one kHz, which tends to limit their application to sensing low frequency motion. Another such type respond to acceleration, changes in velocity, and commonly work by measuring the voltage induced in a piezoelectric material supporting an accelerated mass. Accelerometers have a wide useful frequency range, high sensitivity and low noise, and as such can be suitable for use with the leak detection method of the invention.

The body of a high damping material is conveniently a mat, that is, an area-extensive sheet, that is used to hold the sensor in ground contact simply by the weight of the mat holding the sensor down. Its use enables the avoidance of significant mounting resonance effects between each sensor and the ground because it absorbs and dampens the energy transmitted into it from the ground through the sensors.

One such high damping material that provides extremely effective damping is the polymer type EAR C-1002-12 as supplied by Dowty Energy Control Products.

The damping mat needs to be flexible enough to conform to the contours of the ground, yet it also needs to be stiff enough to maintain the sensor in a position such that the preferred direction of motion sensitivity is at right angles to the mat. A mat of order three millimetres thickness of the above EAR C-1002-12 material will conform to the ground adequately.

To raise the stiffness of the mat around the sensor, a series of concentric annuli of the same material graded in increasing radii can be assembled therearound. Using concentric increasing radii of material will gradually match the stiffness of the unsupported mat to the high stiffness around the sensor without any great discontinuity in stiffness. However, it is very important that a good bond be achieved between the individual layers of mat material and with the sensor. The adhesive needs to be flexible to allow movement, and obviously must not react adversely with the mat material or the sensor itself. A suitable flexible adhesive for use with the EAR C-1002-12 material is that referred to as type A.8438/

A.107 supplied by Apollo Chemicals Limited; it will bond both to the metal of the sensor and to the mat polymer.

To add weight, and to keep the signal, and power-bearing cables from damage, a second mat can be placed over the first one.

The base of the sensor can be conical, that is, be shaped to have an inverted cone whose length can be suited to the ground hardness, and used with the apex of the cone touching the ground. A lightweight spacer can be placed over the sensor to protect the cable in case an operator should use a foot to press the cone into a soft surface material. A suitable material for this spacer would be TUFNELL or even aluminum.

The MTN/1800 piezoelectric accelerometer (with built-in amplifier) supplied by Monitran Ltd, could be a suitable device; it has a mass of 9 gm, sensitivity of 0.1 volts/ms-2, with electrical noise equivalent to 0.003 ms-2, and a resonant frequency of 8 kHz. However, Monitran's similar MTN/1130F is preferable, with a mass of 30 gm, sensitivity of 1.0 volts/ms-2, electrical noise equivalent to 0.001 ms-2, and a resonant frequency of 18 kHz.

If several discrete sensors are used they will be disposed as an array of sensors over the ground. There may be one line of sensors, the individual sensors being preferably equally spaced along the line (a suitable spacing for the sensors would be of the order of a few tens of centimetres), or there may be two such lines at some angle to each other. Indeed, the preference is for two lines orthogonal to each other.

The spatial dimensions of the array will be chosen to ensure that sufficient resolution can be achieved when interpreting the measured ground responses to locate the leak. The array will typically be of the order of a few times the depth of the pipe, thus around two to five metres wide.

The sensors can be all scanned, that is, their output signals read in, simultaneously. Alternatively, even the multiplicity of sensors in a fixed array may have its component sensors scanned sequentially. In the latter case, it is preferred to scan the sensors in pairs, with one, usually the one at the centre of the area, regarded as the reference, and this would always be recorded at the same time as each of the others are scanned. In this way, there will always be at least two sensors being recorded at the same instant.

Rather than a fixed array system, though, there may be employed a scanned system. Thus, a non-contacting laser motion measuring device such as the VPI sensor manufactured by Ometron Ltd, can be used to scan the area of ground above the leak. Alternatively, the laser motion measuring device may be replaced by a non-contacting high frequency microwave ground motion detector. With either the laser device or the microwave device, there is no intrinsic limit to the number of points at which measurements can be made, so that a true distribution of ground motion can be obtained over the area of interest.

The lateral motion of the ground surface can be measured in addition to the vertical motion. The lateral motions in two orthogonal directions, plus the vertical motion, will determine the vector of motion of the ground surface. The vector of motion of ground surface may be measured using any three non-parallel measurement directions.

The noise from the leak can reach any sensor by a wide variety of paths. The direct path from the leak to the sensor through the ground is that taken by the compressional wave known as the P-wave, and will generally be the fastest route from the leak to the sensor. Whenever a P-wave meets an interface, such as the surface of the ground, it undergoes a conversion into other types of waves, typically shear waves, known as S-waves, plus Lamb and Rayleigh waves (which are confined to the ground surface). There are a wide variety of other possible paths, such as along the pipe and then radiated into the ground, and many of these involve reflections, diffractions, and refractions at material interfaces below the ground and at the ground surface. The various paths have different sound speeds.

As a result of these various paths, the total contribution of leak noise to the motion at the sensor can be complicated. Each measurement can be compared with one selected reference measurement, not necessarily the center one, and then the relative timing of the two signals is adjusted relative to each other until the best match is achieved. The relative time shift required to obtain the best match is the time delay of signals between the two stations. This process can be achieved by the signal processing technique known as cross-correlation. Cross-correlation has the benefit of improving the rejection of unwanted signals that are not present at both sensors. The cross correlations would be averaged over several responses to improve the signal-to-noise ratio even further. The cross-correlations give the times of arrival of the various waves at the sensor in question relative to the arrival at the reference sensor.

If only the P-waves existed (with no extra reflections), and the ground were homogeneous, then the relative arrival times at different sensors plotted against position across the array would reveal a portion of a hyperboloid surface whose extremum corresponded with the position in the array immediately above the leak (if in fact the leak is located beyond the area covered by the array then the hyperboloid will indicate that fact since no extremum will be found, and the array is moved to a new position ready to try again). The hyperboloid allows not only the horizontal position of the leak to be determined, but also the wave speed of the leak noise through the ground and the depth of the leak below the ground surface. The presence of other wave types and routes will corrupt the hyperboloid, but it is still possible in principle to determine the location of the leak from the time signals at the various sensors.

There will be occasions when the cross-correlation process does not work. For example, if the leak noise frequency spectrum is not broad band but rather has some distinct frequency bands then deduction of relative arrival times from cross-correlations will be impossible. Also, if there are a large number of reflecting and refracting interfaces underground, then the measured signals will have very confused frequency spectra which will make the interpretation of cross-correlations impossible. This situation may sometimes be exacerbated by the dispersion of ground surface waves, their speed of travel depending upon the frequency. Phase information would be lost by the transmission process. In such circumstances, it is still possible to use other methods to interpret the signals:

The ground will attenuate signal power at least as the square of the inverse of the distance travelled. Location of the point of greatest signal power along the array will give a good indication of leak location.

The ground will attenuate high frequencies faster than low frequencies. The loss of high frequency energy with distance away from the leak can be used to infer the position of the leak.

There are various means that can be used to process the data to improve resolution of the leak location:

If the full vector of ground movement has been measured rather than just the vertical movement, then these additional measurements can be used to assist in separating the different wave types to reduce corruption of the hyperboloid in time-distance space.

In some situations, it will be useful to utilise filtering in the frequency-wave number space to assist in filtering the data to improve results (frequency-wave number space results from a two dimensional Fourier transform of time-distance data).

A mathematical model of the underground conditions can be postulated, and by an inversion procedure the unknowns in the model can be derived. Possible unknowns include leak location, ground attenuation, wave speed in the ground, and the location of any reflecting surfaces.

If the cross-correlation method fails, then analysis involves examination of the attenuation of magnitude with distance from the leak and the increasing attenuation of high frequency energy with distance from the leak. A simple mathematical model of the attenuation of magnitude and frequency with distance can be postulated and inverted to improve leak location, leak depth, and leak noise spectrum. The inversion process may be carried out for each of the two lines of geophones separately. This is simpler to perform and has the added benefit of allowing for different combinations of wave types in the two lines. Even if it turns out that the leak does not lie directly under the array, then as long as signal levels are great enough to be detected, the analysis will point which way the array should be moved in order to lie over the leak. It will be best then to move the array as indicated, and repeat the measurements, rather than to extrapolate outside the array for the leak location.

A distribution of ground motion is typically measured in the geophysics exploration seismology industry by means of a seismic array of vibration sensors to gain information about the structure of the earth up to several kilometres below its surface. In seismic exploration, the source of vibration is deliberately introduced by one means or another, usually an explosion, and the source is measured. The objective is to detect reflecting surfaces within the earth. At great depth, the heavy attenuation imposed by passing the produced noise signal through the ground limits the seismic applications to low frequencies, but at low frequencies the spatial resolution is poor. In comparison with the seismic situation, leaks in water pipes occur at shallow depths of a few metres as opposed to a few kilometres; the source of the leak vibration lies at the buried object to which there is no easy access and the vibration signal of the source is unpredictable, whereas in a seismic situation the vibration is deliberately introduced; and for leak detection the objective is to locate the vibrating source and determine its acoustic power spectrum rather than to identify reflecting geological features within the earth as is required in seismology.

The noise issued by the leak may be broadband random noise up to several kilohertz in frequency but the frequency spectrum may be shaped by the physical process involving the leak. At shallow depths, such high frequencies can survive the heavy attenuation imposed by passing through the ground. The use of high frequencies provides a good spatial resolution that is not obtainable in conventional seismic surveys.

DETAILED DESCRIPTION OF INVENTION

Figure 1:
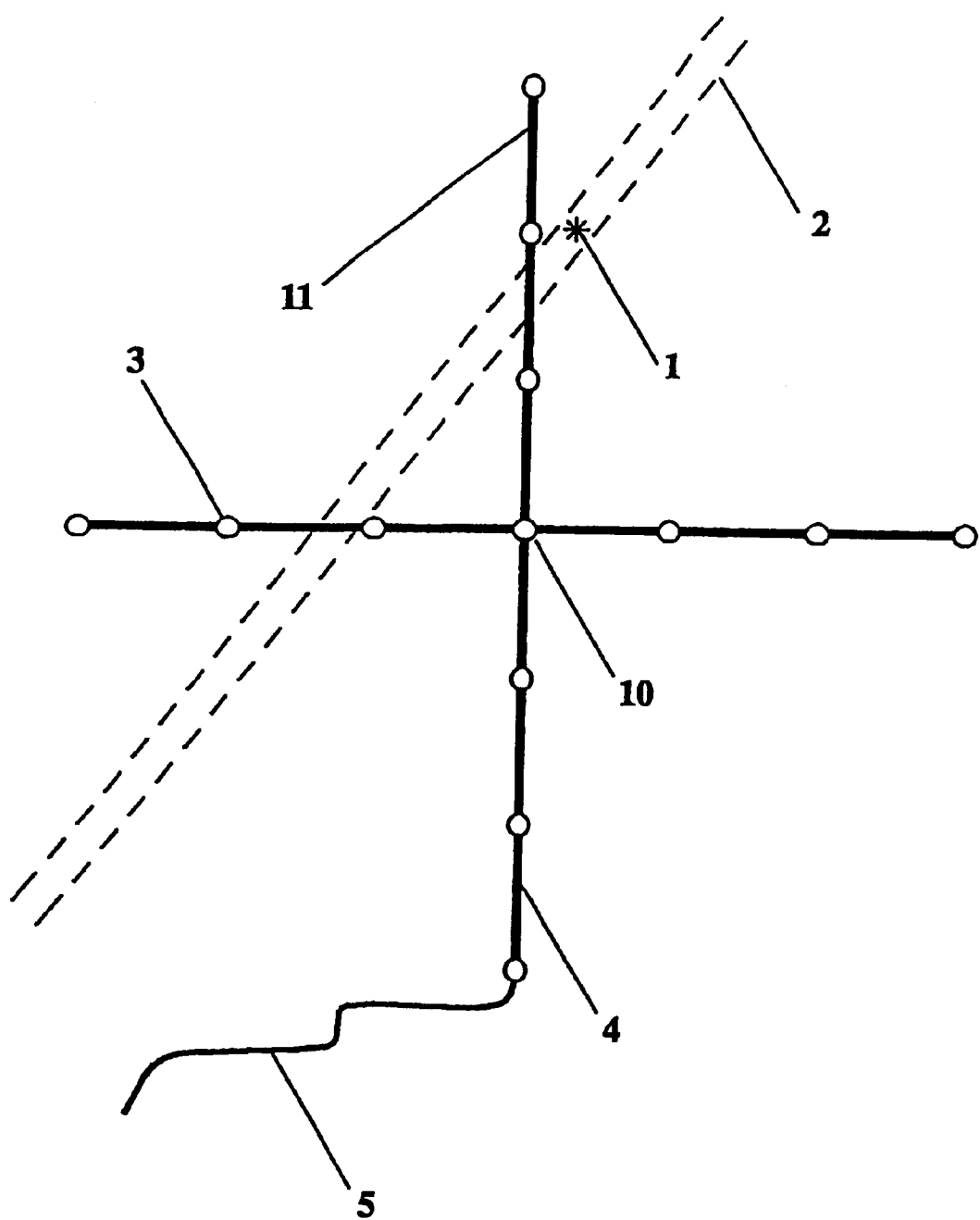
FIG. 1 shows a plan view of the accelerometer array laid out on the surface of the ground in relation to some possible position of an underground pipe with a leak.
Figure 2:
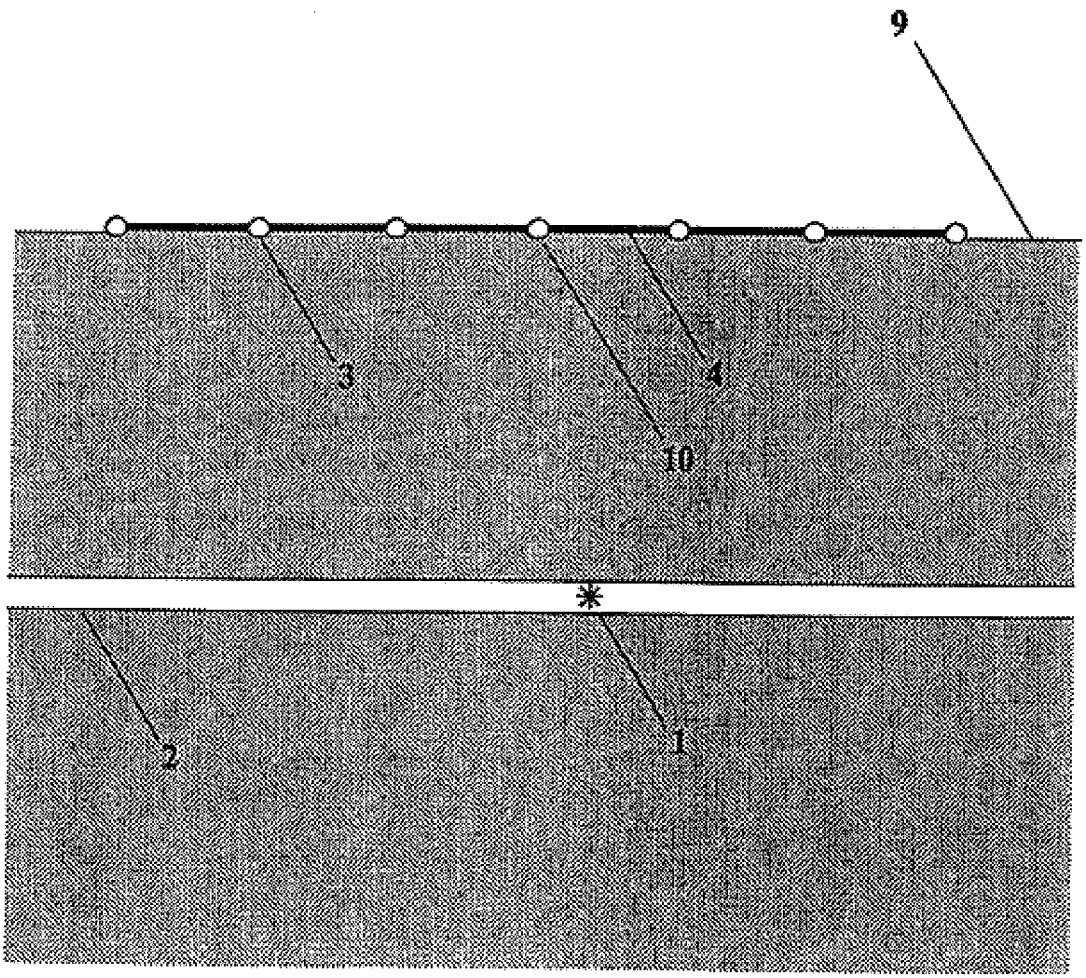
FIG. 2 shows a side view of the same layout as FIG. 1.
Figure 3:
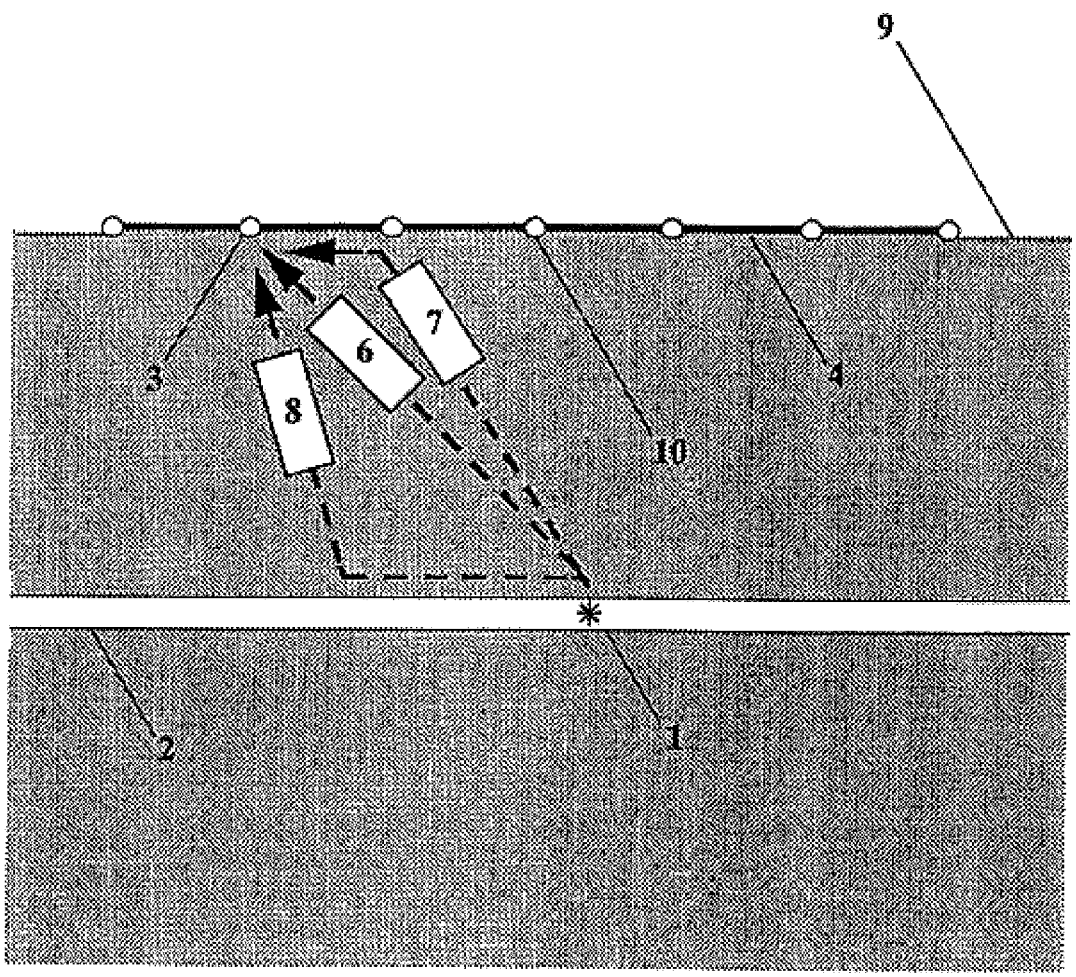
FIG. 3 shows some of the possible paths of noise from the leak to the array.

The embodiment of the invention shown in FIGS. 1–3 involves the use of discrete measurement sensors deployed as an array forming two orthogonal lines. The apparatus is an array 11 of sensitive accelerometers 3 connected by a robust connecting cable 4 and linked to a data collection system (not shown) by means of a data cable 5. The array 11 of accelerometers 3 is deployed on the surface of the ground (9: FIG. 2) so as to detect the location of a leak 1 in a pipe underground (2; shown in dashed outline). The accelerometers 3 are vibration-detecting devices which are specified to work up to high frequencies to measure the vertical motion of the ground surface 9. The array 11 has discrete equally-spaced sensitive accelerometers 3 on two lines at right angles.

Noise from the leak 1 may propagate to any one accelerometer 3 by a number of paths, some of which 6, 7, and 8 as shown in FIG. 3.

The spatial dimensions of the array 11 are chosen to ensure that sufficient resolution can be achieved when interpreting the measured ground responses to locate the leak 1.

In FIG. 3, there is shown the P-wave 6, a compressional wave, travelling from the leak 1 directly to the accelerometer 3. The R-wave 7 is a P-wave travelling to surface from the leak 1 and there converted to a Rayleigh wave along the ground surface 9. Rayleigh waves generally have a lower speed than compressional waves. The F-wave 8 consists of a wave along the pipe 2 travelling at high speed along the high density wall material of the pipe refracting to the surface as a P-wave to the accelerometer 3.

The signals at the various accelerometers 3 are cross-correlated in time (by equipment not shown) with reference to one selected reference accelerometer 10, the center one in this instance. The cross-correlations give the times of arrival of the various waves at the accelerometer 3 in question relative to the arrival at the reference accelerometer 10. If only the P-waves existed, with no extra reflections, and if the ground were homogeneous, then the relative arrival times at different accelerometers 3 plotted against position across the array 11 would reveal an approximate hyperboloid shape whose extremum corresponded with the position in the array immediately above the leak. The hyperboloid allows not only horizontal position of the leak 1 to be determined, but also the wave speed and the depth of the leak 1 below the ground surface 9. The presence of other wave types and routes will corrupt the hyperboloid, but it is still possible in principle to determine the location of the leak 1 from the time signals at the various accelerometers 3.

As well as the cross-correlations, an estimate of the power in the signal from each accelerometer 3 may be plotted against position along each array 11. The position of the peak along each arm of the array 11 indicates the location of the leak 1. Also, the attenuation of the signals from the accelerometers 3 as a function of frequency will vary with position along the array 11. This variation can be plotted against position to give an estimate of the position of the leak 1.

With the cross-correlation, the power variation with position, and the variation in attenuation with frequency with position, there will be obtained three different indicators of the position of the leak 1. Having three methods allows confirmation of the leak location, and enables the method of the invention to work even if under particular circumstances one or two of the three methods fails.

If the leak 1 lies laterally outside the physical dimensions of the array 11, then there is sufficient information to determine that fact and to gain some idea of the direction and location of the leak 1. The array 11 can then be moved to the new location so that an improved estimate of the leak 1 position can be made.

Figure 4:
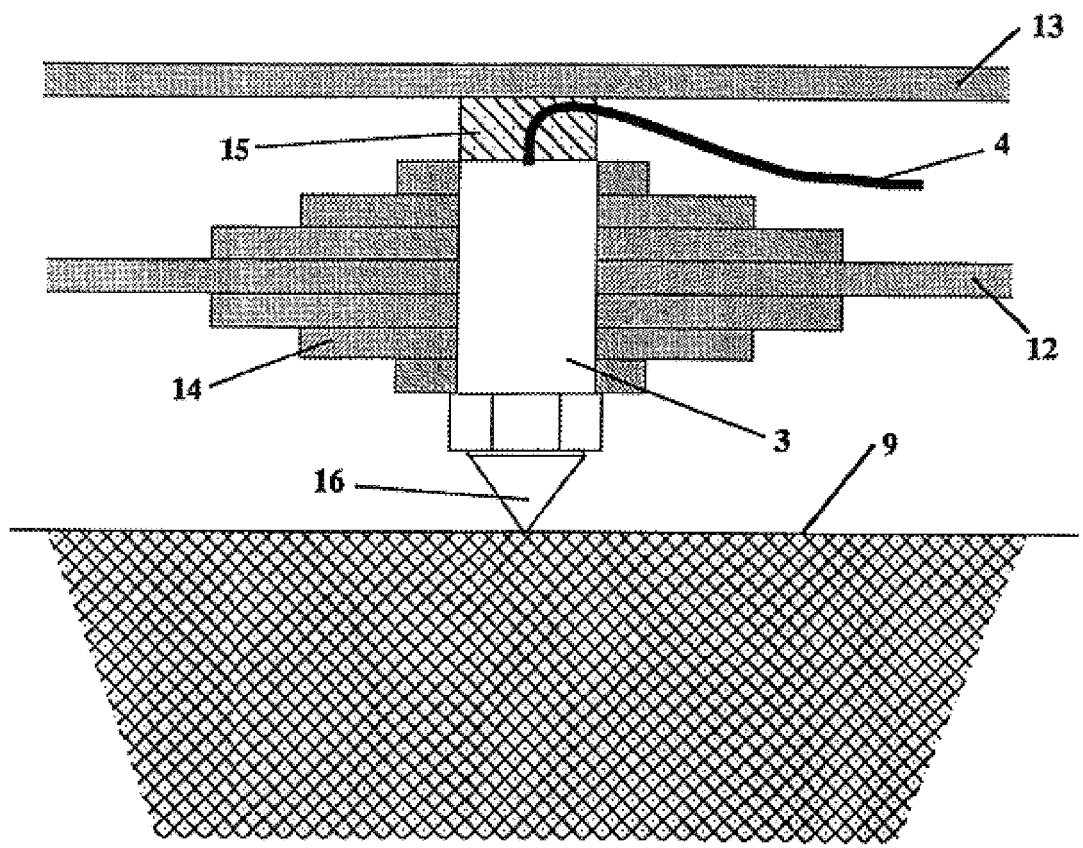
FIG. 4 shows the detail of the mat which supports the accelerometer.

An example of a particularly preferred structure of sensor apparatus, displaying details of the support for the accelerometer, is shown in FIG. 4. The accelerometer 3 incorporates a conical steel tip 16 which in use is pressed into contact with the ground surface 9. The tip 16 is supported in a lower (as viewed) vibration-dampening polymer mat 12 by a number of polymer annuli 14 of different radii. A light stiff TUFNELL support block 15 protects the accelerometer cable. A second mat 13 provides both additional weight and environmental protection for the accelerometer cables.

What is claimed is:

1. Ground-motion detection apparatus comprising a multiplicity of discrete ground-motion sensors each in use contactable with the ground, together with a body of a damping material to hold each sensor in ground contact and thereby avoid significant mounting resonance effects between the sensor and the ground.

2. Apparatus as claimed in claim 1, wherein the multiplicity of sensors is disposed as a two-dimensional array.

3. Apparatus as claimed in claim 2, in which the array is in the form of two orthogonally-disposed linear arrays of equispaced sensors.

4. Apparatus as claimed in claim 3, wherein the sensors are each of the accelerometer type, with a mass of up to 100 g and sensitive to frequencies up to 10 kilohertz.

5. Apparatus as claimed in claim 4, wherein the base of the accelerometer is conical, that is shaped to have a cone whose length is suited to the ground hardness.

6. Apparatus as claimed in claim 2, wherein the sensors are each of the accelerometer type, with a mass of up to 100 g and sensitive to frequencies up to 10 kilohertz.

7. Apparatus as claimed in claim 6 wherein the body of the damping material is a mat.

8. Apparatus as claimed in claim 7, wherein, to raise the stiffness of the mat around each accelerometer, a series of concentric annuli of the mat material graded in increasing radii is assembled around the accelerometer.

9. Apparatus as claimed in claim 8, wherein the base of the accelerometer is conical, that is shaped to have a cone whose length is suited to the ground hardness.

10. Apparatus as claimed in claim 7, wherein the base of the accelerometer is conical, that is shaped to have a cone whose length is suited to the ground hardness.

11. Apparatus as claimed in claim 6, wherein the base of the accelerometer is conical, that is shaped to have a cone whose length is suited to the ground hardness.

12. Apparatus as claimed in claim 1, wherein the sensors are each of the accelerometer type, with a mass of up to 100 g and sensitive to frequencies up to 10 kilohertz.

13. Apparatus as claimed in claim 12, wherein the base of the accelerometer is conical, that is shaped to have a cone whose length is suited to the ground hardness.

14. Apparatus as claimed in claim 1, wherein the body of the damping material is a mat.

15. Apparatus as claimed in claim 14, wherein, to raise the stiffness of the mat around an accelerometer, a series of concentric annuli of the mat material graded in increasing radii is assembled around the accelerometer.

16. Apparatus as claimed in claim 15, wherein, to add weight, a second mat is placed over a first one.

17. A method of determining the location of a leak in an underground pipe carrying a fluid, in which method the movement of the ground caused by the fluid as it leaks from the pipe is listened to using ground-motion detection apparatus, and by suitably combining and operating upon the signal information received at each sensor there is determined the actual location of the leak, said ground-motion detection apparatus comprising a multiplicity of discrete ground-motion sensors each in use contactable with the ground, together with a body of a damping material to hold each sensor in ground contact and thereby avoid significant mounting resonance effects between the sensor and the ground.

18. A method as claimed in claim 17, applied to the location of a leak in an underground water pipe.

19. A method as claimed in claim 17, in which there is received and processed signal information relating to the motion of the ground both vertically and laterally.

20. A method as claimed in claim 19, in which, where the multiplicity of sensors is in the form of an array that is linear, or has linear components, then the line, or one of the lines, of sensors is aligned with the underground pipe being checked.

21. A method as claimed in claim 19, in which the detection of ground motion is effected over an area of ground extending over the suspected location of the leak and of lateral dimensions that do not exceed thrice the depth of the pipe in which the leak has occurred.

22. A method as claimed in claim 19, in which the multiplicity of sensors has its component sensors scanned sequentially in pairs, with one sensor regarded as a reference.

23. A method as claimed in claim 17, in which where the multiplicity of sensors is in the form of an array that is linear, or has linear components, then the line, or one of the lines, of sensors is aligned with the underground pipe being checked.

24. A method as claimed in claim 17, in which the detection of ground motion is effected over an area of ground extending over the suspected location of the leak and of lateral dimensions that do not exceed thrice the depth of the pipe in which the leak has occurred.

25. A method as claimed in claim 17, in which the multiplicity of sensors has its component sensors scanned sequentially in pairs, with one sensor regarded as a reference.

26. A method as claimed in claim 17, wherein the multiplicity of sensors is disposed as a two-dimensional array.

27. A method as claimed in claim 26, wherein the array is in the form of two orthogonally-disposed linear arrays of equispaced sensors.

28. A method as claimed in claim 27, in which one of the linear arrays of sensors is aligned with the underground pipe being checked.

29. A method as claimed in claim 26, in which the detection of ground motion is effected over an area of ground extending over the suspected location of the leak and of lateral dimensions that do not exceed thrice the depth of the pipe in which the leak has occurred.

30. A method as claimed in claim 26, in which the multiplicity of sensors has its component sensors scanned sequentially in pairs, with one sensor regarded as a reference.

* * * * *